United States Patent
Jakubov et al.

(10) Patent No.: US 10,805,037 B2
(45) Date of Patent: Oct. 13, 2020

(54) MODULATION SELECTION BASED ON DEMODULATION DATA

(71) Applicant: QUALCOMM Incorporated, San Diego, CA (US)

(72) Inventors: Ondrej Jakubov, Bristol (GB); Matthew Collins, Bradford on Avon (GB); William Connolley, Coton (GB)

(73) Assignee: QUALCOMM Incorporated, San Diego, CA (US)

(*) Notice: Subject to any disclaimer, the term of this patent is extended or adjusted under 35 U.S.C. 154(b) by 60 days.

(21) Appl. No.: 15/833,418

(22) Filed: Dec. 6, 2017

(65) Prior Publication Data
US 2019/0173606 A1 Jun. 6, 2019

(51) Int. Cl.
*H04L 1/00* (2006.01)
*H04L 27/00* (2006.01)
*H04L 1/20* (2006.01)

(52) U.S. Cl.
CPC .......... *H04L 1/0003* (2013.01); *H04L 1/0009* (2013.01); *H04L 1/0025* (2013.01); *H04L 1/203* (2013.01); *H04L 27/0008* (2013.01); *H04L 27/0012* (2013.01)

(58) Field of Classification Search
CPC ........ H04W 4/80; H04W 24/02; H04L 1/003; H04L 27/0008; H04L 27/0009; H04L 27/2627; H04L 27/0012; H04L 27/04; H04L 27/12; H04L 27/20; H04L 27/2649; H04L 27/00; H04L 27/02
See application file for complete search history.

(56) References Cited

U.S. PATENT DOCUMENTS

| | | | |
|---|---|---|---|
| 9,628,309 | B1 | 4/2017 | Luong et al. |
| 10,009,148 | B1* | 6/2018 | Chen .................. H04W 24/02 |
| 2005/0068895 | A1 | 3/2005 | Stephens et al. |

(Continued)

FOREIGN PATENT DOCUMENTS

| EP | 1363437 A1 | 11/2003 |
|---|---|---|
| GB | 2413250 A | 10/2005 |

OTHER PUBLICATIONS

International Search Report and Written Opinion—PCT/US2018/055278—ISA/EPO—dated Jan. 24, 2019.

*Primary Examiner* — Asad M Nawaz
*Assistant Examiner* — Najeeb Ansari
(74) *Attorney, Agent, or Firm* — Kevin M. Donnelly

(57) ABSTRACT

This disclosure provides systems, devices, apparatus and methods, including computer programs encoded on storage media, for receiving, by a first wireless device, symbols modulated using a first modulation scheme from a second wireless device, demodulating the symbols to obtain demodulated bits, determining a signal quality associated with the first modulation scheme based on a number of the demodulated bits, determining a value indicative of an expected bit error rate associated with a second modulation scheme based on the determined signal quality associated with the first modulation scheme, determining whether to switch to the second modulation scheme based on the determined value, and transmitting a message to the second wireless device to initiate a protocol exchange with the second wireless device to switch the modulation scheme to the second modulation scheme based on the determination.

16 Claims, 10 Drawing Sheets

(56) References Cited

U.S. PATENT DOCUMENTS

| | | |
|---|---|---|
| 2010/0034106 A1 | 2/2010 | Hu et al. |
| 2014/0086125 A1* | 3/2014 | Polo ................. H04W 52/0229 370/311 |
| 2014/0321581 A1 | 10/2014 | Luong et al. |
| 2016/0128117 A1* | 5/2016 | Engelien-Lopes .... H04W 76/14 455/41.2 |
| 2016/0128126 A1* | 5/2016 | Engelien-Lopes .... H04L 1/0009 370/329 |
| 2016/0295622 A1* | 10/2016 | Huang ................. H04W 12/06 |

* cited by examiner

MODULATION SELECTION BASED ON DEMODULATION DATA

TECHNICAL FIELD

This disclosure relates generally to wireless communications, and more specifically, to selectively switching modulation schemes based on signal quality metrics.

DESCRIPTION OF THE RELATED TECHNOLOGY

A number of client devices, also referred to as stations (STAs), may share a wireless communication medium. To transmit and receive wireless communications over the medium, the transmitting and receiving devices must establish a modulation scheme that defines how data is modulated for transmission between the devices. In typical deployments, an on-chip controller of one of the devices selects the modulation scheme, and thus, the data rate for wireless communications. In some such scenarios the controller can be configured to determine a packet error rate (PER) and to use the PER when determining whether to switch modulation schemes from a lower data rate scheme to a higher data rate scheme and vice versa. Additionally or alternatively, the controller may use a received signal strength indication (RSSI) to make the determination. But it is challenging to estimate what the PER would be at a higher data rate modulation scheme based on the PER or RSSI for a current, lower data rate modulation scheme. For example, for given wireless medium conditions, the lower data rate modulation scheme may be operating at a near-zero bit error rate (BER), while the higher data rate modulation scheme, if switched to, may result in a near 100% BER. These approaches also require a large number of received packets for the host application to reliably determine that the receiver would not have problems if switching from a lower rate, more robust modulation scheme to a higher rate, less robust modulation scheme.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. In some implementations, the method includes receiving, by a first wireless device, symbols modulated using a first modulation scheme from a second wireless device. The method further includes demodulating, by the first wireless device, the symbols to obtain demodulated bits and determining a signal quality associated with the first modulation scheme based on a number of the demodulated bits. The method further includes determining, by the first wireless device, a value indicative of an expected bit error rate associated with a second modulation scheme based on the determined signal quality associated with the first modulation scheme. The method further includes determining, by the first wireless device, whether to switch to the second modulation scheme based on the determined value and transmitting a message to the second wireless device to initiate a protocol exchange with the second wireless device to switch the modulation scheme to the second modulation scheme based on the determination.

Another innovative aspect of the subject matter described in this disclosure can be implemented in wireless communication device. In some implementations, the wireless communication device includes at least one antenna to receive symbols modulated using a first modulation scheme from a second wireless device. The wireless communication device further includes at least one transceiver coupled with the at least one antenna to receive the symbols. The wireless communication device further includes a demodulator to demodulate the received symbols to obtain demodulated bits and to determine a signal quality associated with the first modulation scheme based on a number of the demodulated bits. The wireless communication device further includes a processor to: determine a value indicative of an expected bit error rate associated with a second modulation scheme based on the determined signal quality associated with the first modulation scheme, determine whether to switch to the second modulation scheme based on the determined value, and transmit a message to the second wireless device via the at least one transceiver and the at least one antenna to initiate a protocol exchange with the second wireless device to switch the modulation scheme to the second modulation scheme based on the determination.

In some implementations of the method and wireless communication device described above, the determination of the value indicative of the expected bit error rate includes: determining, for each of the number of demodulated bits, a first metric; determining an average of the first metric over the number of demodulated bits; and determining a standard deviation of the first metric over the number of demodulated bits. In some such implementations, the determination of the value indicative of the expected bit error rate further includes determining a second metric based on the average and the standard deviation, the second metric being indicative of the expected bit error rate. In some such implementations, determining the second metric includes dividing the standard deviation by the average. Additionally, in some implementations, the symbols are received in a number of packets and determining the average of the first metric includes determining an average of the first metric for each packet. In some such implementations, determining the standard deviation includes determining a standard deviation for each packet, and determining the second metric includes determining the second metric for each packet. In some such implementations, an average of the second metric over all of the number of packets is then determined. In some such implementations, the determination of whether to switch to the second modulation scheme based on the determined value includes comparing the average of the second metric to a threshold.

In some implementations of the method and wireless communication device described above, it is also determined whether a quantity of symbols or a quantity of demodulated bits has reached a threshold, and, responsive to determining that the quantity has reached the threshold, determining the second metric.

In some implementations of the method and wireless communication device described above, after determining to switch to the second modulation scheme based on the determined value, additional symbols modulated using the second modulation scheme are received from the second wireless device. The additional symbols are demodulated to obtain additional demodulated bits and a bit error rate of a number of the additional demodulated bits is determined. In some such implementations, it is then determined whether to switch to the first modulation scheme based on the bit error rate. The wireless device may then transmit another message to the second wireless device to initiate another protocol exchange with the second wireless device to switch the modulation scheme to the first modulation scheme based on the determination.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
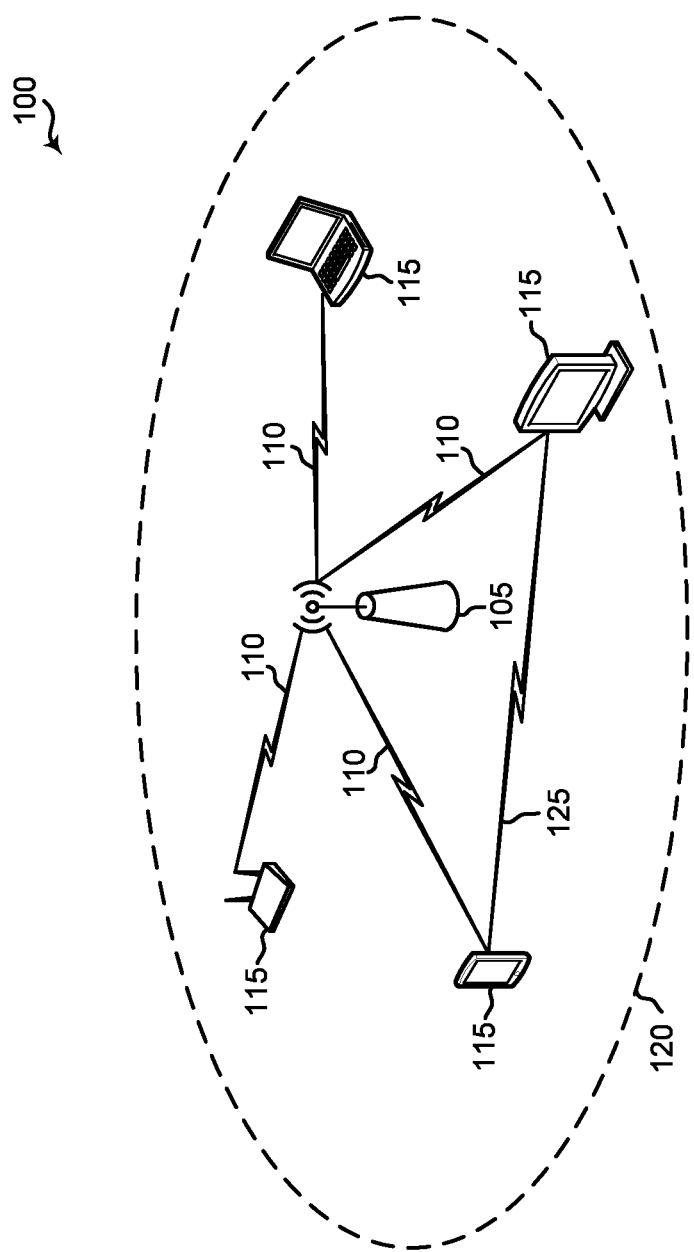
FIG. 1 shows a pictorial diagram of an example wireless communication system.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the Institute of Electrical and Electronics Engineers (IEEE) 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Various implementations relate generally to the selective switching of modulation schemes based on signal quality metrics obtained via over-the-air condition assessment. Some implementations more specifically relate to receiving and demodulating data received using a first modulation scheme, determining signal quality metrics associated with the first modulation scheme, and determining a value indicative of a bit error rate (BER) that would be expected if switching to a second modulation scheme based on the signal quality metrics. In some implementations, the determination of the signal quality metrics can include the determination of one or more intermediate metrics. In some such implementations, the one or more intermediate metrics can be determined on a sequential basis. In some specific implementations, the sequential determination of the intermediate metrics is performed entirely in hardware. The determination of the value indicative of the expected BER can include the determination of a final metric based on the intermediate metrics. In some specific implementations, the final metric can be determined entirely in firmware.

Particular implementations of the subject matter described in this disclosure can be implemented to realize one or more of the following potential advantages. In some implementations, the described techniques can be used to determine a final metric that is normalized such that it is agnostic to the gain settings enabling a determination of the quality of the final metric over different gain settings. Additionally, the described approach for generating the intermediate metrics and the final bit metric doesn't require storage of the values of all the metrics for each bit because the respective values can be calculated sequentially. Furthermore, the number of bits required to obtain a desired measure of confidence in the resultant final bit metric can be reduced. The desired measure of confidence can reflect a probability that the desired BER using the second modulation scheme will be achieved.

FIG. 1 shows a pictorial diagram of an example wireless communication system 100. According to some aspects, the wireless communication system 100 can be an example of a wireless local area network (WLAN) (and will hereinafter be referred to as WLAN 100). For example, the WLAN 100 can be a network implementing at least one of the IEEE 802.11 family of standards. The WLAN 100 may include numerous wireless devices such as an access point (AP) 105 and multiple associated stations (STAs) 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a basic service set (BSS). FIG. 1 additionally shows an example coverage area 120 of the AP 105, which may represent a basic service area (BSA) of the WLAN 100. While only one AP 105 is shown, the WLAN network 100 can include multiple APs 105. An extended service set (ESS) may include a set of connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the PHY and medium access control (MAC) layers. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the wireless devices described herein also may communicate in other frequency bands, such as the emerging 6 GHz band, which may support both licensed and unlicensed communications. The wireless devices in the WLAN 100 also can be configured to communicate over other frequency bands such as shared licensed frequency bands, where multiple operators may have a license to operate in the same or overlapping frequency band or bands.

In some cases, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some cases, ad hoc networks may be implemented within a larger wireless network such as the WLAN 100. In such implementations, while the STAs 115 may be capable of communicating with each other through the AP 105 using communication links 110, STAs 115 also can communicate directly with each other via direct wireless communication links 125. Additionally, two STAs 115 may communicate via a direct communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other peer-to-peer (P2P) group connections.

Some types of STAs 115 may provide for automated communication. Automated wireless devices may include those implementing internet-of-things (IoT) communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, AP 105 may use multiple antennas or antenna arrays to conduct beamforming operations for directional communications with a STA 115. Beamforming (which may also be referred to as spatial filtering or directional transmission) is a signal processing technique that may be used at a transmitter (e.g., AP 105) to shape and/or steer an overall antenna beam in the direction of a target receiver (e.g., a STA 115). Beamforming may be achieved by combining elements in an antenna array in such a way that transmitted signals at particular angles experience constructive interference while others experience destructive interference. In some cases, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (e.g., or antenna port) such that the desired beamforming effects are achieved. In some cases, these weights may be determined before beamforming can be employed. For example, the transmitter (e.g., the AP 105) may transmit one or more sounding packets to the receiver in order to determine CSI.

WLAN 100 may further support multiple-input, multiple-output (MIMO) wireless systems. Such systems may use a transmission scheme between a transmitter (e.g., AP 105) and a receiver (e.g., a STA 115), where both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (e.g., each transmission may be beamformed differently). The receiver (e.g., STA 115) may try multiple beams (e.g., antenna subarrays) while receiving the signals.

WLAN PDUs may be transmitted over a radio frequency spectrum band, which in some examples may include multiple sub-bands or frequency channels. In some cases, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiving device to decode the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control and channel estimation, among other uses. The legacy preamble may also be used to maintain compatibility with legacy devices.

In some cases, aspects of transmissions may vary based on a distance between a transmitter (for example, AP 105) and a receiver (for example, STA 115). WLAN 100 may otherwise generally benefit from AP 105 having information regarding the location of the various STAs 115 within coverage area 120. In some examples, relevant distances may be computed using RTT-based ranging procedures. As an example, WLAN 100 may offer such functionality that produces accuracy on the order of one meter (or even centimeter-level accuracy). The same (or similar) techniques employed in WLAN 100 may be applied across other radio access technologies (RATs). For example, such RTT-based ranging functionality may be employed in developing "relative geofencing" applications (i.e., applications where there is a geofence relative to an object of interest such as a mobile device, a car, a person, etc.). Various such examples are considered in accordance with aspects of the present disclosure. For example, car keys may employ RTT estimation for PKES systems. RTT-based geofences around an adult may monitor the position of a child within the geofence. Additionally, drone-to-drone and car-to-car RTT functionality may help prevent collisions.

Figure 2:
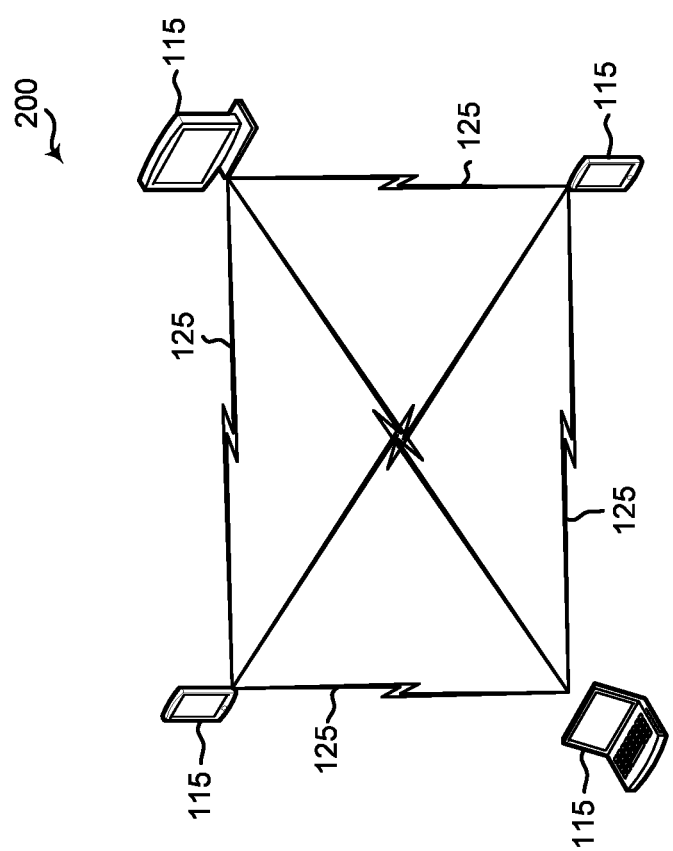
FIG. 2 shows another pictorial diagram of an example wireless communication system.

FIG. 2 shows a pictorial diagram of another example wireless communication system 200. According to some aspects, the wireless communication system 200 can be an example of a WLAN (and will hereinafter be referred to as WLAN 200). For example, the WLAN 200 can be a network implementing at least one of the IEEE 802.11 family of standards. The WLAN 200 may include multiple STAs 115. As described above, each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

The WLAN 200 is an example of an ad hoc network. STAs 115 can communicate directly with each other via direct wireless communication links 125. In some implementations, the WLAN 200 is an example of a Bluetooth network and the direct wireless communication links 125 are Bluetooth links. Bluetooth is a short-range communications wireless technology offering features such as robustness, low power consumption and low cost. Bluetooth can be subdivided into Basic Rate (BR) and Low Energy (LE) wireless technologies. Both the BR physical (PHY) layer and the LE PHY layer operate in the unlicensed Industrial, Scientific and Medical (ISM) 2.4 GHz short-range radio frequency band (e.g., 2400-2483.5 MHz). Additionally, both BR and LE systems utilize a frequency hopping transceiver and shaped, binary frequency modulation. The BR PHY supports a BR mode having a bit rate of 1 megabit per second (Mbps). The BR PHY also supports an Enhanced Data Rate mode having a bit rate of 2 or 3 Mbps. The LE PHY supports two modes: LE 1M and LE 2M supporting bit rates of 1 Mbps and 2 Mbps, respectively.

Bluetooth provides the effect of full duplex transmission via a Time-Division Duplex (TDD) scheme. LE supports both frequency divisional multiple access (FDMA) and time division multiple access (TDMA) schemes. Forty physical channels separated by 2 MHz are used in the FDMA scheme. For TDMA, a polling scheme is used in which one device transmits at a predetermined time and a corresponding device responds after a predetermined time interval.

During typical operation, a physical radio channel can be shared by multiple Bluetooth devices, referred to as a piconet, that are synchronized to a common clock and frequency (channel) hopping pattern. The adaptive hopping technique improves Bluetooth co-existence with co-located static (non-hopping) systems. One of the Bluetooth devices, referred to as the master, provides the synchronization to the other Bluetooth devices, which are referred to as slaves.

The physical channel is sub-divided into time units referred to as events. Data is transmitted between Bluetooth devices in packets that are positioned in these events. There are four types of events: Advertising, Extended Advertising, Periodic Advertising and Connection. Bluetooth devices that need to form a connection to another Bluetooth device listen for connectable advertising packets. If the advertising device ("advertiser") is using a connectable advertising event, the initiating device ("initiator") may make a connection request using the same advertising PHY channel on which it received the advertising packet. If the advertiser receives and accepts the connection request, a connection is established and the initiator becomes the master device and the advertiser becomes a slave device.

Connection events are used to transmit data packets between the master and slave devices. Frequency channel hopping occurs at the start of each connection event, which is initiated by the master. During the connection event, the master and slave devices alternate transmitting data packets to one another using the same PHY frequency channel. The PHY link provides bidirectional packet transport between the master and slave devices. A PHY channel can include multiple slave devices and slaves are permitted to have PHY links to more than one master at a time. Additionally, a device is permitted to be a master and a slave at the same time.

Figure 3:
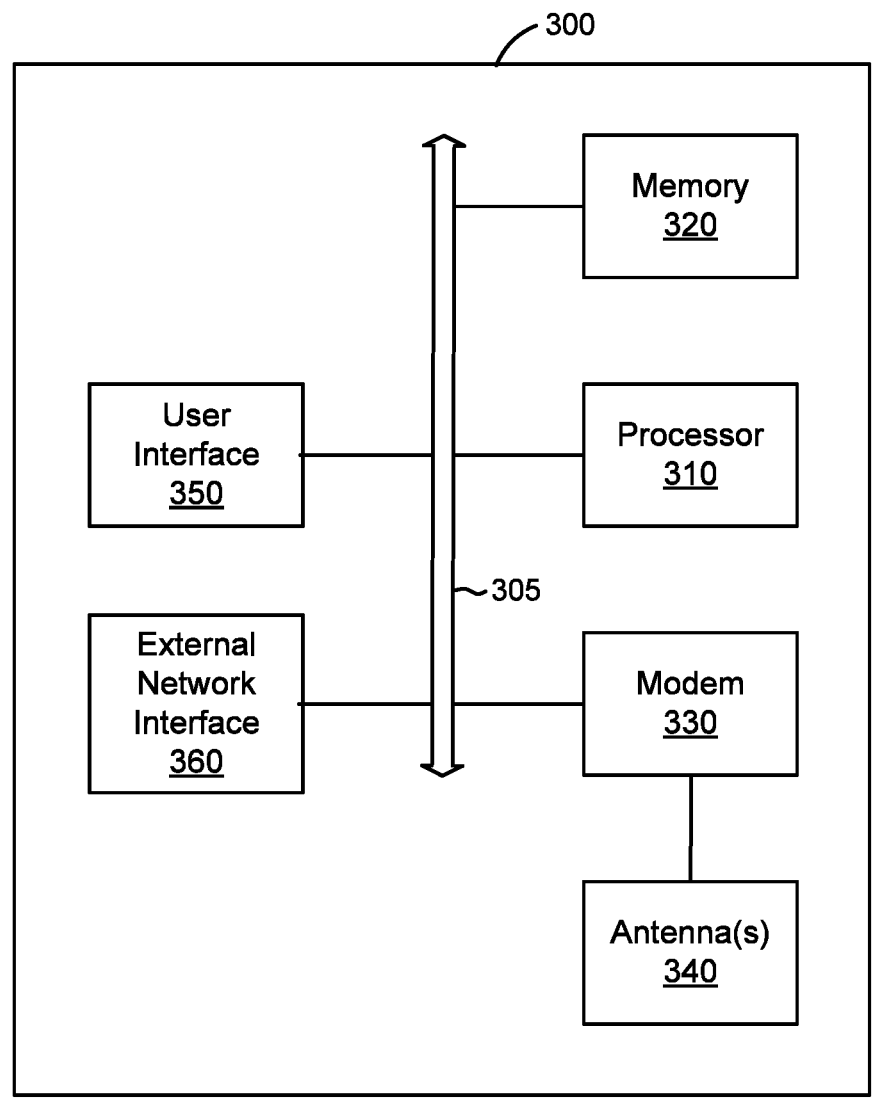
FIG. 3 shows a block diagram of an example access point (AP) for use in wireless communication.

FIG. 3 shows a block diagram of an example access point (AP) 300 for use in wireless communication. For example, the AP 300 may be an example of aspects of the AP 105 described with reference to FIG. 1. The AP 300 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The AP 300 includes a processor 310, a memory 320, a modem 330, at least one antenna 340, a user interface (UI) 350, and an external network interface 360 (for example, to connect with a wired or wireless backhaul). Each of the components (or "modules") described with reference to FIG. 3 can communicate with one another, directly or indirectly, over at least one bus 305.

The memory 320 can include random access memory (RAM) and read-only memory (ROM). The memory 320 also can store processor- or computer-executable software (SW) code containing instructions that, when executed by the processor 310, cause the processor to perform various functions described herein for wireless communication, including generation and transmission of a downlink frame and reception of an uplink frame.

The processor 310 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 310 processes information received through the modem 330 and the external network interface 360. The processor 310 also can process information to be sent to the modem 330 for transmission through the antenna 340 and information to be sent to the external network interface 360. The processor 310 can generally be configured to perform various operations related to generating and transmitting a downlink frame and receiving an uplink frame.

The modem 330 is generally configured to modulate packets and to provide the modulated packets to the antenna 340 for transmission, as well as to demodulate packets received from the antenna 340 to provide demodulated packets. The modem 330 generally includes or is coupled with at least one radio frequency (RF) transmitter and at least one RF receiver, which may be combined into one or more transceivers. For example, the AP 300 can typically include multiple transceivers and antennas 340. For example, in some AP implementations, the AP 300 can include multiple transmit antennas (each with a corresponding transmit chain) and multiple receive antennas (each with a corresponding receive chain). The modem 330 can communicate bi-directionally, via the antenna 340, with at least one station 115 as, for example, shown in FIG. 1. The AP 300 may communicate with a core or backhaul network through the external network interface 360 to gain access to external networks including the Internet.

Figure 4:
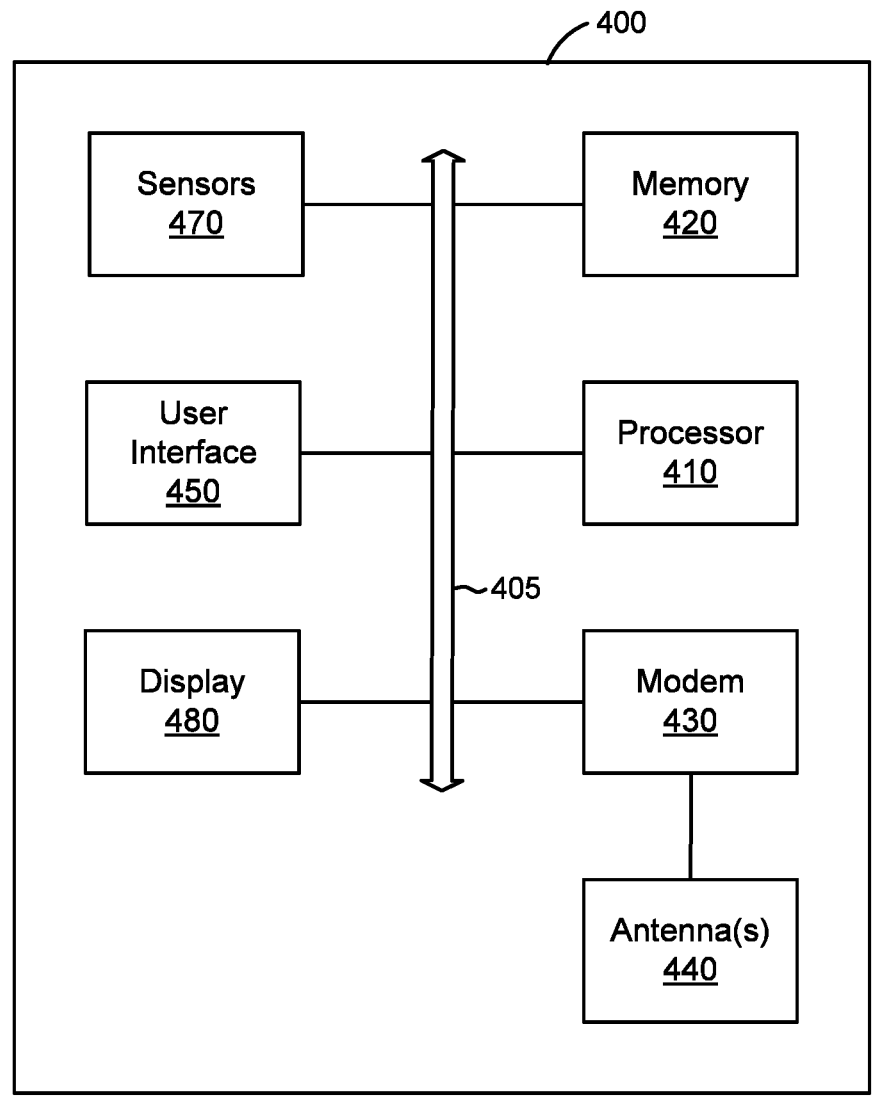
FIG. 4 shows a block diagram of an example station (STA) for use in wireless communication.

FIG. 4 shows a block diagram of an example wireless station (STA) 400 for use in wireless communication. For example, the STA 400 may be an example of aspects of the STA 115 described with reference to FIG. 1. The STA 400 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The STA 400 includes a processor 410, a memory 420, a modem 430 and at least one antenna 440. In some implementations, the STA 400 additionally includes some or all of the following: a user interface (UI) 450 (such as a touchscreen or keypad), one or more sensors 470 (such as one or more inertial sensors, accelerometers, temperature sensors, pressure sensors, or altitude sensors), and a display 480. Each of the components (or "modules") described with reference to FIG. 4 can communicate with one another, directly or indirectly, over at least one bus 405.

The memory 420 can include RAM and ROM. The memory 420 also can store processor- or computer-executable SW code containing instructions that, when executed, cause the processor 410 to perform various functions described herein for wireless communication, including reception of a downlink frame and generation and transmission of an uplink frame.

The processor 410 includes an intelligent hardware device such as, for example, a CPU, a microcontroller, an ASIC or a PLD such as an FPGA, among other possibilities. The processor 410 processes information received through the transceiver 430 as well as information to be sent to the transceiver 430 for transmission through the antenna 440. The processor 410 can be configured to perform various operations related to receiving a downlink frame and generating and transmitting an uplink frame.

The modem 430 is generally configured to modulate packets and provide the modulated packets to the antenna 440 for transmission, as well as to demodulate packets received from the antenna 440 to provide demodulated packets. The modem 430 generally includes at least one radio frequency (RF) transmitter and at least one separate RF receiver, which may be combined into one or more transceivers. For example, in some implementations, the STA 400 can include multiple transmit antennas (each with a corresponding transmit chain) and multiple receive antennas (each with a corresponding receive chain). The modem 430 can communicate bi-directionally, via the antenna 440, with at least one AP 105, for example, shown in FIG. 1. As is described above, in some implementations, the modem also can communicate bi-directionally, via the antenna 440, with other STAs directly without the use of an intermediary AP, for example, as described above with reference to the system of FIG. 2.

To transmit and receive wireless communications over a shared access medium, the transmitting and receiving devices must establish a modulation scheme that defines how data is modulated for transmission between the devices. In typical deployments, an on-chip controller of one of the devices selects the modulation scheme, and thus, the data rate for wireless communications. In some such scenarios the controller can be configured to determine a packet error rate (PER) and to use the PER when determining whether to switch modulation schemes from a lower data rate scheme to a higher data rate scheme and vice versa. Additionally or alternatively, the controller may use a received signal strength indication (RSSI) to make the determination. But it is challenging to estimate what the PER would be at a higher data rate modulation scheme based on the PER or RSSI for a current, lower data rate modulation scheme. For example, for given wireless medium conditions, the lower data rate modulation scheme may be operating at a near-zero bit error rate (BER), while the higher data rate modulation scheme, if switched to, may result in a near 100% BER. These approaches also require a large number of received packets for the host application to reliably determine that the receiver would not have problems if switching from a lower rate, more robust modulation scheme to a higher rate, less robust modulation scheme.

Various implementations relate generally to the selective switching of modulation schemes based on signal quality metrics obtained via over-the-air condition assessment. Some implementations more specifically relate to receiving and demodulating data received using a first modulation scheme, determining signal quality metrics associated with the first modulation scheme, and determining a value indicative of a bit error rate (BER) that would be expected if switching to a second modulation scheme based on the signal quality metrics. In some implementations, the determination of the signal quality metrics can include the determination of one or more intermediate metrics. In some such implementations, the one or more intermediate metrics can be determined on a sequential basis. In some specific implementations, the sequential determination of the intermediate metrics is performed entirely in hardware. The determination of the value indicative of the expected BER can include the determination of a final metric based on the intermediate metrics. In some specific implementations, the final metric can be determined entirely in firmware.

In some implementations, the final metric is normalized such that it is agnostic to the gain settings enabling a determination of the quality of the final metric over different gain settings. Additionally, the described approach for generating the intermediate metrics and the final bit metric doesn't require storage of the values of all the metrics for each bit because the respective values can be calculated sequentially. Furthermore, the number of bits required to obtain a desired measure of confidence in the resultant final bit metric can be reduced. The desired measure of confidence can reflect a probability that the desired BER using the second modulation scheme will be achieved.

Figure 5:
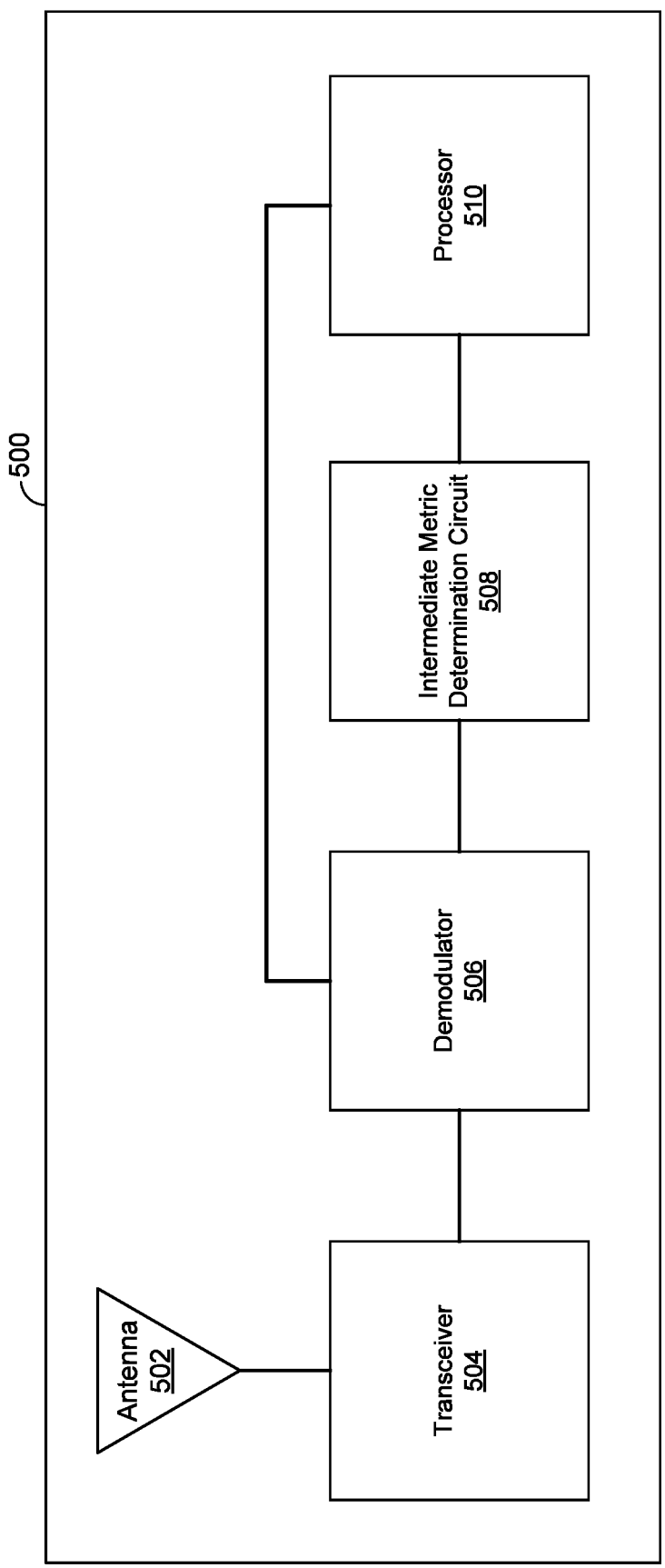
FIG. 5 shows a block diagram of an example apparatus for use in wireless communication according to some implementations.

FIG. 5 shows a block diagram of an example apparatus 500 for use in wireless communication according to some implementations. In some implementations, the apparatus 500 can be an example of the STAs 115 and 400 described above with reference to FIGS. 1 and 4, respectively. For example, the apparatus 500 can be a wireless communications device such as a mobile phone, user equipment (UE), or access terminal (AT). The apparatus 500 includes one or more antennas 502 coupled with one or more transceivers 504 to transmit and receive wireless signals, for example, including symbols that can be modulated according to a variety of modulation schemes. In some implementations, the modulated symbols can be modulated according to various Gaussian Frequency-Shift Keying (GFSK), Differential Phase-Shift Keying (DPSK), Differential Quaternary Phase-Shift Keying (DQPSK) or Differential Encoded 8-Phase Shift Keying (D8PSK) modulation schemes. In some implementations, the apparatus 500 can be configured as a Bluetooth device and the modulated symbols can be modulated according to one of the Bluetooth wireless communication protocols as defined in the Bluetooth Core Specification, such as the Bluetooth Basic Rate (BR) core configuration, the Bluetooth Enhanced Data Rate (EDR) core configuration, the High Speed (HS) Bluetooth core configuration, and the Bluetooth Low Energy (BLE) core configuration. In some specific implementations, the modulated symbols may be modulated based on the BLE core configuration. In some such implementations, the modulated symbols may be more specifically modulated based on the LE 1M or LE 2M modulation schemes having bit rates of 1 Megabit per second (Mbps) and 2 Mbps, respectively. In some other implementations the modulated symbols may be modulated based on the 2 Mbps and 3 Mbps EDR modes.

The transceivers 504 are coupled with a demodulator 506 configured to demodulate packets received from the antenna 502 and transceiver 504 to provide demodulated bits r(N) (the value of the bit at symbol time N, which is equivalent to the value of the bit at bit index N in cases in which one bit is transmitted per symbol). For example, the demodulator 506 is configured to extract modulated symbols from the received packets and to reverse map the symbols to points in a modulation constellation. The demodulator 506 is coupled with a processor 510 to provide the demodulated bits r(N) to the processor for processing, evaluation or interpretation, for example, by one or more host applications executing on the processor.

The demodulator 506 is further configured to estimate or determine a signal quality associated with a current modulation scheme based on a number of the demodulated bits r(N). In some implementations, the demodulator 506 is configured to generate, based on the demodulated bits r(N), an initial bit metric W(N) for each of the demodulated bits that is indicative of the signal quality associated with the current modulation scheme (where W(N) is the value of the initial bit metric at symbol time N−1). The output W(N) of the demodulator 506 is fed into an intermediate metric determination circuit 508. The intermediate metric determination circuit 508 is configured to further process the initial bit metric signal W(N) to provide one or more intermediate metrics. In some such implementations, the initial and intermediate bit metrics are determined entirely in hardware (that is, without firmware or software). The intermediate bit metrics are subsequently output to the processor 510 for further processing, evaluation or interpretation.

In some implementations, the processor 510 is further configured to determine, based on the determined signal quality associated with the current modulation scheme, a value indicative of an expected bit error rate (BER) that may be expected if the received modulated symbols were modulated using a second modulation scheme (for example, a modulation scheme having a higher data rate). For example, the processor 510 can be configured to determine a final metric indicative of the expected BER based on a function of the intermediate bit metrics. In some implementations, the final metric is determined entirely in firmware (that is, without software such as one or more host applications executing on the processor 510). In some implementations, the firmware executing on the processor 510 is further configured to determine whether to switch to the second modulation scheme based on the determined value (for example, the value of the final metric). Responsive to determining to switch to the second modulation scheme, the processor 510 generates a communication to be transmitted to a second Bluetooth device to initiate a protocol exchange with the second device to switch the modulation scheme such that the second device begins modulating subsequent symbols according to the second modulation scheme.

Figure 6:
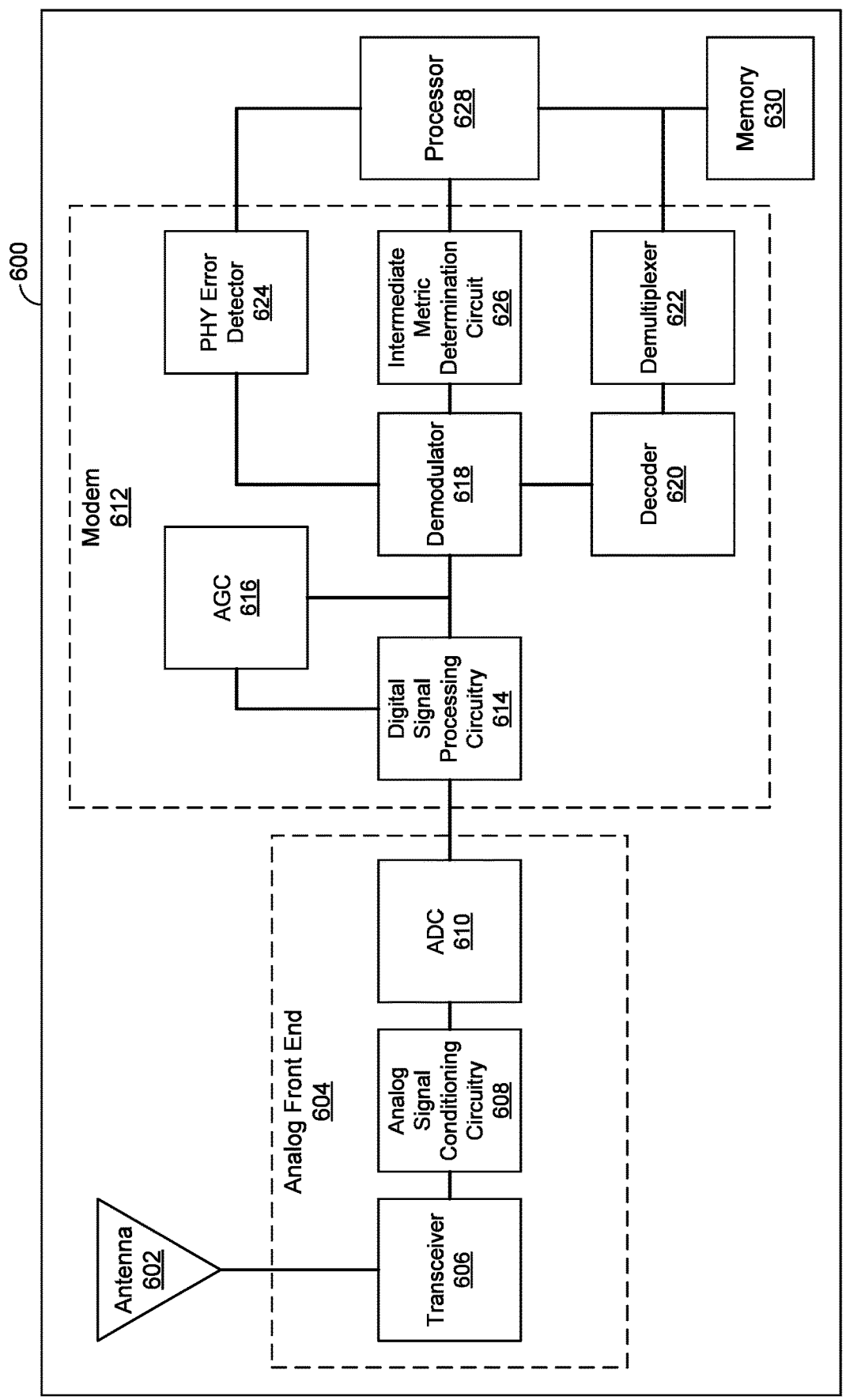
FIG. 6 shows a block diagram of an example apparatus for use in wireless communication according to some implementations.

FIG. 6 shows a block diagram of an example apparatus 600 for use in wireless communication according to some implementations. In some implementations, the apparatus 500 can be an example of the STAs 115 and 400 described above with reference to FIGS. 1 and 4, respectively, or the apparatus 500 described with reference to FIG. 5. For example, the apparatus 600 can be a wireless communications device such as a mobile phone, user equipment (UE), or access terminal (AT). The apparatus 600 includes one or more antennas 602 coupled with an analog front end 604, and specifically, to one or more transceivers 606, to transmit and receive wireless signals. The wireless signals can include symbols that can be modulated according to a variety of modulation schemes. In some implementations, the apparatus 600 can be configured as a Bluetooth device and the modulated symbols can be modulated according to one of the Bluetooth wireless communication protocols as defined in the Bluetooth Core Specification, such as the Bluetooth BR core configuration, the Bluetooth EDR core configuration, the HS Bluetooth core configuration, and the BLE core configuration. In some specific implementations, the modulated symbols may be modulated based on the BLE core configuration. In some such implementations, the modulated symbols may be more specifically modulated based on the LE 1M or LE 2M modulation schemes having bit rates of 1 Megabit per second (Mbps) and 2 Mbps, respectively. In some other implementations the modulated symbols may be modulated based on the 2 Mbps and 3 Mbps EDR modes. In some other implementations, the modulation schemes may be based on other configurations, such as the modulation and coding schemes (MCSs) associated with IEEE 802.11n, 802.11ac, 802.11ad, 802.11ah, 802.11ax or 802.11ay packets.

The transceivers 606 are coupled with analog signal conditioning circuitry 608 configured to condition the wireless analog signals received from the antennas 602 and the transceivers 606. For example, the signal conditioning circuitry 608 can include various analog filters, a low-noise amplifier, a down converter, gain stages, a local oscillator, impairment compensation circuitry, among other possibilities. The conditioned analog signals are input to an analog-to-digital converter (ADC) 610 configured to convert the analog signals into digital signals. The digital signals output by the analog front end 604, and specifically the ADC 610, are input to a modem 612.

The modem 612 includes digital processing circuitry 614, automatic gain control (AGC) 616, a demodulator 618, a decoder 620, a demultiplexer 622, a PHY error detector 624 and an intermediate metric determination circuit 626. The digital signals received by the modem 612 are provided to digital signal processing circuitry 614 configured to acquire a received signal, for example, by detecting the presence of the signal and estimating the initial timing and frequency offsets. The digital signal processing circuitry 614 is further configured to digitally condition the digital signals output from the ADC 610. For example, the digital conditioning can include channel (narrowband) filtering, analog impairment conditioning, such as correcting for I/Q imbalance, and applying digital gain to ultimately obtain a narrowband signal r(N) (the value of the digitally-conditioned signal at symbol time N, which is equivalent to the value of the bit at bit index N in cases in which one bit is transmitted per symbol). The output of the digital signal processing circuitry r(N) is fed to the AGC 616, which is configured to use information extracted from the digital signals, for example, in one or more received training fields, to determine an appropriate gain. The output of the AGC 616 is in turn coupled with a second input of the digital signal processing circuitry 614 to adjust the gain applied to the digital signals.

The output of the digital signal processing circuitry 614 also is coupled with the demodulator 618. In some implementations, the demodulator 618 is more specifically a decision feedback demodulator. The demodulator 618 is configured to demodulate the digitally-conditioned signal r(N) received from the digital signal processing circuitry to provide demodulated bits d(N) (the value of the bit at symbol time N, which is equivalent to the value of the bit at bit index N in cases in which one bit is transmitted per symbol). For example, the demodulator 618 is configured to extract modulated symbols from the signal r(N) and to reverse map the symbols to points in a modulation constellation. The demodulator 618 is coupled with the decoder 620, which is configured to decode the demodulated bits d(N) to provide decoded bits. The decoded bits are then fed to the demultiplexer 622, which is configured to demultiplex the decoded bits. The demultiplexed bits are then provided to the processor 628 for processing, evaluation or interpretation, for example, by one or more host applications executing on the processor. The processor 628 is further coupled to a memory 630 that may store the demultiplexed bits as well as data, in the form of bits, representing decisions, evaluations or results based on processing the demultiplexed bits.

The demodulator 618 is further configured to estimate or determine a signal quality associated with a current modulation scheme based on a number of the demodulated bits d(N). In some implementations, the demodulator 618 is configured to generate, based on the demodulated bits d(N), an initial bit metric W(N) for each of the demodulated bits that is indicative of the signal quality. In some implementations, the initial bit metric W(N) is determined entirely in hardware (that is, without firmware or software).

In some implementations, the initial bit metric W(N) may be based on a maximum likelihood (ML) criterion. In some implementations, the initial bit metric W(N) converges to a finite mean value as the SNR approaches infinity. In implementations in which the demodulator 618 is a decision feedback demodulator, and in which GFSK modulation is used, for example, in Bluetooth LE 1M and LE 2M communications, the initial bit metric W(N) output from the demodulator 618 can be expressed as Equation (1) below.

$$W(N)=M^*(N)r(N+1) \qquad (1)$$

M(N) represents a history of the demodulator 618 at symbol time N and can be expressed as Equation (2) below.

$$M(N)=\alpha \times M(N-1)e^{j\pi h d}(N-2)+R(N) \qquad (2)$$

In Equation (2), h is the assumed modulation index and α represents a remembrance factor, which determines the number of previously demodulated symbols utilized by the demodulator when performing demodulation. The remembrance factor α may be dynamically adjusted based on, for example, a received RSSI. The estimated value of the demodulated bits d(N) can be expressed as Equation (3) below.

$$d(N-2)=\text{sign}[Im\{M^*(N-1)r(N)\}] \qquad (3)$$

The output W(N) of the demodulator 618 is provided to the intermediate metric determination circuit 626.

Figure 7:
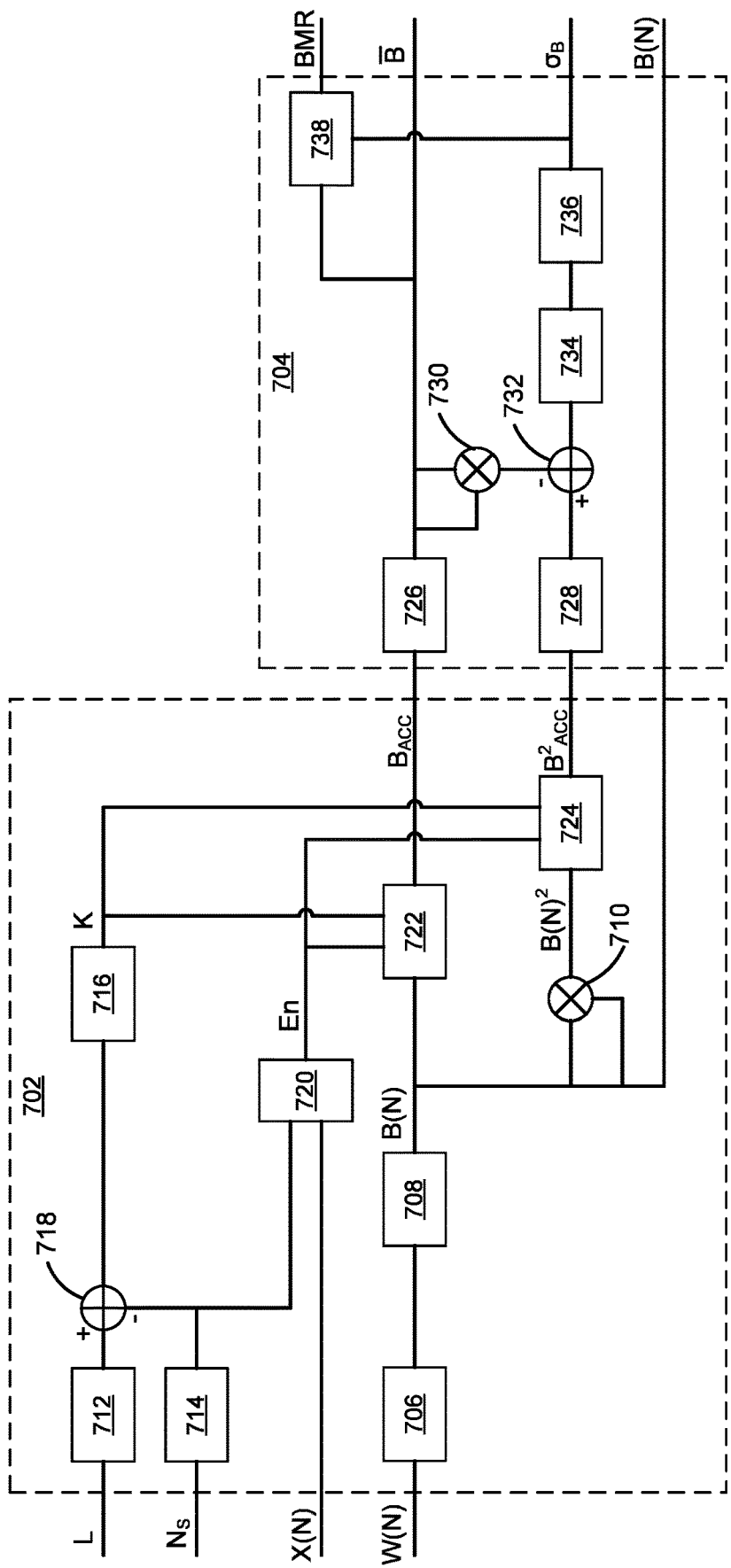
FIG. 7 shows a block diagram illustrating an intermediate metric determination circuit and final metric determination module according to some implementations.

The intermediate metric determination circuit 626 is configured to further process the initial bit metric signal W(N) to provide one or more intermediate metrics. In some such implementations, the values of the intermediate bit metrics are determined entirely in hardware (that is, without firmware or software). In some other implementations, the intermediate metric determination circuit 626 can be implemented, at least in part, in firmware or software. FIG. 7 shows a block diagram illustrating an intermediate metric determination circuit 702 and final metric determination module 704 according to some implementations. As described above, in some implementations the intermediate metric determination circuit 702 can be implemented entirely in hardware (that is, without firmware or software). In some other implementations, the intermediate metric determination circuit 702 can be implemented, at least in part, in firmware or software. The final metric determination module 704 can be implemented within a processor, such as the processor 628 described with reference to FIG. 6. In some such implementations, the final metric determination module 704 is implemented entirely in firmware (that is, without software such as one or more host applications executing on the processor 628). In some other implementations, the final metric determination module 704 can be implemented, at least in part, in software.

The intermediate metric determination circuit 626 can be implemented in a variety of ways and may produce a variety of metrics. As such, the particular intermediate metric determination circuit 702 described with reference to FIG. 7 is but one example implementation of the intermediate metric determination circuit 626 and should not be considered as limiting in all implementations. In the illustrated implementation, the intermediate metric determination circuit 702 includes a complex number converter 706, an absolute value determination circuit 708, a multiplier 710, shifters 712, 714 and 716, a subtractor 718, a comparator 720, and first and second accumulators 722 and 724.

In some implementations in which the demodulator 618 is a decision feedback demodulator, the value of a first one of the intermediate metrics B(N) can be determined based on Equation (4) below.

$$B(N)=|Im(W(N))| \qquad (4)$$

In some such implementations, the complex number converter 706 is configured to receive the initial bit metric signal W(N) and to output the imaginary component Im(W(N)). The absolute value circuit 708 is configured to receive the imaginary component Im(W(N)), determine the absolute value, and output the first intermediate metric B(N). Taking the absolute value ensures that the resultant bit metric B(N) is agnostic as to whether the value of the bit was a logic 1 or logic 0.

In some implementations, the PHY error detector 624 is configured to receive the intermediate metric B(N) on a per bit basis and to detect the occurrence of erroneous demodulated bits based on a value of the intermediate metric. For example, the PHY error detector 624 can be configured to compare the value of the intermediate metric B(N) to a threshold and output or assert a signal indicative of a bit error to the processor 628 based on determining that the intermediate metric meets or exceeds the threshold. Such PHY error detection can be useful in situations in which a packet has a bit error but the cyclic redundancy check (CRC) still passes. In response to receiving the signal indicating an erroneous bit, the processor 628 may initiate a request for retransmission or simply mark the associated packet as lost. As described below, the processor 628 also may initiate a protocol exchange with a second wireless device to change the modulation scheme, for example, to a lower data rate scheme.

In the illustrated implementation, a number of bits L is input to a shifter 712 that right-shifts L by a value of 3, which is equivalent to dividing L by a value of 8, to determine the number of bytes. For example, the length L may be the length of a payload in a currently received packet. In some implementations, a configurable initial number of bits $N_S$ are skipped to avoid a transient portion. The initial number $N_S$ is input to both a second shifter 714 and a subtractor 718. Similar to the length L, the shifter 714 right-shifts $N_S$ by a value of 3 to convert from bits to bytes. In the illustrated implementation, the right-shifted value of $N_S$ as well as a value representative of a bit count X(N) is input to the comparator 720. The comparator 720 compares the two values and outputs an enable signal En. For example, if the right-shifted value of $N_S$ is less than the bit count X(N), the resultant enable signal En has a value of logic 1 (the comparator asserts the enable signal En), else the comparator outputs a logic 0. The enable signal En is provided to the first and second accumulators 722 and 724, respectively, for enabling the accumulators to accumulate the values of respective metrics described below (except for the initial bits that were skipped). The subtractor 718 subtracts the value of $N_S$ from the value of the right-shifted version of L and provides the difference K to another shifter 716, which left-shifts the sum K by a value of 3 to revert back from bytes to bits. The left-shifted value of the sum K is provided to the first and second accumulators 722 and 724, respectively. Here, K indicates the number of bits over which the accumulators 722 and 724 accumulate the values of the respective metrics.

The first intermediate metric B(N) is input to the first accumulator 722. The first accumulator 722 accumulates the values of the first intermediate metric B(N) on a sequential basis over the total number of bits K to provide a second intermediate metric, referred to as the accumulated bit metric $B_{ACC}$. In some such implementations, the first accumulator 722 is configured to store or otherwise provide the accumulated bit metric $B_{ACC}$ on a per bit basis for storage in a read back register for subsequent use by the final metric determination module 704. The intermediate metric B(N) also is multiplied by itself by the multiplier 710 to provide a squared metric B(N)², which is provided to the second accumulator 724. The second accumulator 724 accumulates the square of the intermediate metric B(N)² on a sequential basis over the total number of bits K to provide a third intermediate metric, $B_{ACC}^2$, the accumulated square of the first intermediate metric B(N). In some such implementations, the second accumulator 724 is configured to store or otherwise provide the accumulated bit metric $B_{ACC}^2$ on a per bit basis for storage in a read back register for subsequent use by the final metric determination module 704.

In some implementations, the processor 628 is further configured to determine, based on the determined signal quality associated with the current modulation scheme, a value indicative of an expected BER that may be expected if the received modulated symbols were modulated using a second modulation scheme. For example, the final metric determination module 704, which may be implemented in firmware executing on the processor 628, can be configured to determine a final metric indicative of the expected BER based on a function of the intermediate bit metrics obtained from the intermediate metric determination circuit 702.

In the illustrated implementation, the final metric determination module 704 includes first and second division modules 726 and 728, respectively, which divide the intermediate accumulated metrics $B_{ACC}$ and $B_{ACC}^2$ by the current value of K. The output $\overline{B}$ of the first division module 726 represents the average or mean of the intermediate metric $B_{ACC}$ over K bits. The output of the second division module 728 represents the average or mean of the intermediate metric $B_{ACC}^2$ over K bits. The final value of $\overline{B}$ over K bits can be expressed as Equation (5).

$$\overline{B} = \frac{1}{L-N_S}\left(\sum_{n=N_S}^{L-1} B(n)\right) \quad (5)$$

The value of $\overline{B}$ is provided to a multiplication module 730 that multiples $\overline{B}$ with itself to obtain a squared value $\overline{B}^2$. The squared value $\overline{B}^2$ is then provided to a subtraction module 732 that subtracts the squared value $\overline{B}^2$ from the average of the intermediate accumulated metric $B_{ACC}^2$. The difference is then provided to an absolute value module 734 that determines the absolute value of the difference. The absolute value of the difference is then provided to a square root determination module 736 that provides the square root of the absolute value of the difference. In some such implementations, the output $\sigma_B$ of the square root determination module 736 represents a standard deviation $\sigma_B$ of B(N) over the length K, which can also be expressed as Equation (6).

$$\sigma_B = \sqrt{\sum_{n=N_S}^{L-1}(B(N)-\overline{B})^2} \quad (6)$$

In some implementations, a third division module 738 divides the standard deviation $\sigma_B$ by the average $\overline{B}$ to obtain the final metric—a bit metric ratio BMR—represented as Equation (7).

$$BMR = \frac{\sigma_B}{\overline{B}} \quad (7)$$

Dividing the standard deviation $\sigma_B$ divided by the average $\overline{B}$ has the effect of normalizing the standard deviation $\sigma_B$ such that the final metric BMR is agnostic to the gain settings enabling a determination of the quality of the final metric over different gain settings. And notably, the described approach for generating the initial bit metric W(N), the intermediate metrics B(N), $B_{ACC}$ and $B_{ACC}^2$, the mean $\overline{B}$, the standard deviation $\sigma_B$, and the final bit metric ratio BMR doesn't require storage of the values of all the metrics for each bit because the respective values are calculated sequentially.

The bit metric ratio BMR is indicative of an expected BER that may be expected if the received modulated symbols were modulated using a second modulation scheme. Generally, the bit metric ratio BMR characterizes the quality of the bit decisions made throughout the course of L received bits using the first modulation scheme. For example, in implementations in which L represents the length of the payload bits of a received packet, the bit metric ratio BMR characterizes the quality of the bit decisions made throughout the course of the received packet. For example, the bit metric ratio BMR is informative of how great the average distribution is relative to the mean, which, in turn, is informative of the level of noise, which can be translated into SNR or secondarily into an estimate of the BER. Such a characterization of decision quality using the first modulation scheme is indicative of a BER that would be expected if switching to the second modulation scheme.

The processor 628 is further configured to determine whether to switch from the first modulation scheme, currently being used to transmit and receive wireless communication signals between the apparatus 600 and a second wireless device, to a second modulation scheme. In various implementations, the determination of whether to switch modulation schemes is based on the value of a final bit metric, such as the bit metric ratio BMR described with reference to Equation (7). As described above, in some specific implementations, the first and second modulation schemes may be based on the BLE core configuration. In some such implementations, the first modulation scheme may be an LE 1M modulation scheme and the second modulation scheme may be the higher rate LE 2M modulation scheme. In some other implementations, the first modulation scheme may be based on the 2 Mbps EDR mode and the second modulation scheme may be the higher rate 3 Mbps EDR mode. In some other implementations, the first and second modulation schemes may be based on other configurations, such as the modulation and coding schemes (MCSs) associated with IEEE 802.11n, 802.11ac, 802.11ad, 802.11ah, 802.11ax or 802.11ay packets.

Figure 8:
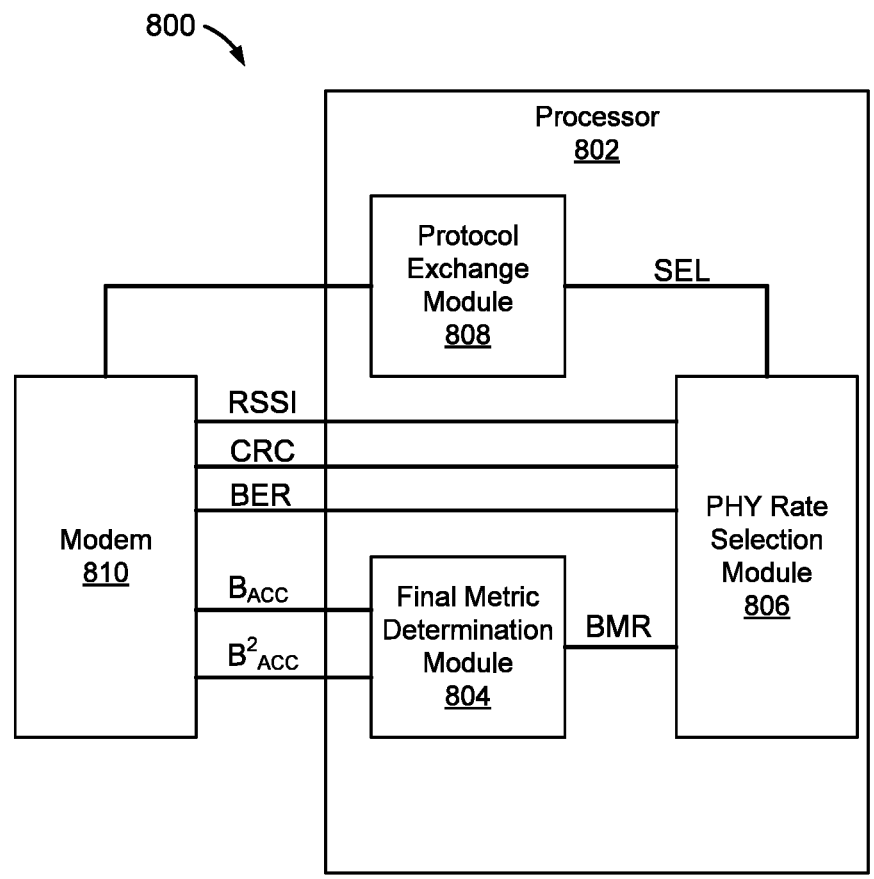
FIG. 8 shows a block diagram of an example system for determining whether to switch from a first modulation scheme to a second modulation scheme according to some implementations.

FIG. 8 shows a block diagram of an example system 800 for determining whether to switch from a first modulation scheme to a second modulation scheme according to some implementations. The system 800 can include a processor 802 as well as a number of modules executing on the processor. The processor 802 may be an example of the processor 628 described with reference to FIG. 6. In the illustrated implementation, the processor 802 executes a final metric determination module 804, a PHY rate selection module 806 and a protocol exchange module 808. In some implementations, each of the modules 804 and 806 is implemented as firmware stored in a memory (such as the memory 630) for execution by the processor 802. Additionally or alternatively, aspects of each of the modules 804 and 806 may be implemented in software stored in the memory for execution by the processor. In some implementations, the protocol exchange module 808 is implemented in software stored in a memory (such as the memory 630). Each of the modules 804, 806 and 808 can generally be implemented as non-transitory instructions (or "code") executable by the processor 802.

As described above, the processor 802 can execute the final metric determination module 804 to determine a normalized final metric, such as the bit metric ratio BMR described with reference to Equation (7). For example, the final metric determination module 804 can be an example of the final metric determination module 704 described with reference to FIG. 7. In such implementations, the final metric determination module 804 can receive as inputs the intermediate metrics $B_{ACC}$ and $B_{ACC}^2$ from the modem 810, for example, from an intermediate metric determination circuit such as the intermediate metric determination circuits 626 and 702 described with reference to FIGS. 6 and 7, respectively.

The processor 802 can execute the PHY rate selection module 806 to determine whether to switch from the first modulation scheme to the second modulation scheme and vice versa. In some implementations, to determine whether to switch from the first modulation scheme to the second modulation scheme, the PHY rate selection module 806 is configured to compare the final metric BMR to a threshold. In some implementations, the second modulation scheme has a higher data rate than the first modulation scheme, and is thus less robust than the first modulation scheme. In some specific implementations, the modulated symbols may be modulated based on the BLE core configuration. For example, the modulated symbols may be more specifically modulated based on the LE 1M or LE 2M modulation schemes having bit rates of 1 Megabit per second (Mbps) and 2 Mbps, respectively. In some such implementations, the PHY rate selection module 806 is configured to compare the final metric BMR to a static threshold. In some other implementations, the PHY rate selection module 806 is configured to compare the final metric BMR to a dynamic threshold that may change based on the particular modulation scheme to be switched to (for example, in implementations in which the PHY rate selection module 806 may select from multiple second modulation schemes having different data rates).

In some implementations in which the first modulation scheme is the LE 1M modulation scheme and the second modulation scheme is the higher data rate LE 2M modulation scheme, it is desirable to switch to the second modulation scheme only when an expected BER using the second modulation scheme is less than a particular suitable value associated with link quality. For example, in some example implementations of a receiver and demodulator, the particular value may be a value less than 1e-4 (a typical requirement for link quality, which can be translated into an equivalent signal-to-noise ratio (SNR) of 13 dB in some examples). In some such example use cases, to achieve a BER of 1e-4 for the second modulation scheme, a BER of 1e-6 should first be achieved using the first modulation scheme. This determined BER for the first modulation scheme assumes that the same power is received using the first and second modulation schemes, and that the second modulation scheme occupies twice the bandwidth, requiring an SNR of 16 dB (equivalent to a BER of 1e-6). As described above, the characterization of decision quality represented by the bit metric ratio BMR is indicative of a BER that would be expected if switching to the second modulation scheme. For example, the PHY rate selection module 806 can be configured to compare the bit metric ratio BMR using the first modulation scheme to a threshold of, for example, 0.1, to guarantee a BER of 1e-6, which, as just described above, would be indicative of an expected BER of 1e-4 if using the second modulation scheme.

The PHY rate selection module 806 is configured to determine to switch to the second modulation scheme in response to determining that the final metric BMR is less than the threshold. In response to determining to switch to the second modulation scheme, the PHY rate selection module 806 can output a select signal SEL indicating the determination to switch, and in some implementations, the particular second modulation scheme to switch into.

As described above, the length L defines the container that includes the bits used in the generation of the final metric BMR. As is also described above, in some implementations the length L represents a length of the payload bits in a received packet. In some implementations, the PHY rate selection module 806 can be configured to determine a bit metric ratio BMR on a per packet basis for each consecutive packet of a number of packets received from the other wireless device. In some such implementations, the PHY rate selection module 806 evaluates the final metric BMR for each of the received packets and determines whether to switch modulation schemes based on a function of the BMRs received for the multiple packets. For example, the PHY rate selection module 806 can be configured to average the BMRs obtained for the packets and to determine whether to switch to the second modulation scheme by comparing the average BMR to a threshold. The number of packets to be received to determine the average BMR can be variable and based on a variety of factors. In some specific examples, the number of received packets used to determine the average BMR can be ten, twenty or more. Generally, the statistical confidence in a switching decision based on an average BMR increases with an increasing number of analyzed packets contributing to the average BMR. But it is also desirable to minimize the number of bits that are required to be demodulated before determining whether to switch modulation schemes. It should also be noted that, in some other implementations, other statistical functions other than an average may be used to analyze the BMRs determined for the multiple packets.

In some other implementations, the length L can be non-packet based. For example, the length L can define or mark a threshold number of bits that are to be demodulated before determining whether to switch modulation schemes. Similar to the packet-based approach described above, the statistical confidence in a switching decision based on the BMR increases with an increasing number of demodulated bits contributing to the BMR, but it is also desirable to minimize the number of bits that are required to be demodulated using the first modulation scheme before determining whether to switch modulation schemes. As such, the value of the length L is selected to obtain a desired measure of confidence in the resultant bit metric ratio BMR while minimizing the number of bits required to determine the BMR. For example, the value of the length L can be in the range of approximately 1000 bits to approximately 10,000 bits in some implementations depending on the desired measure of confidence. The desired measure of confidence can reflect a probability that the desired BER using the second modulation scheme will be achieved. For example, using the described techniques it has been demonstrated that only approximately 5920 bits received using the first modulation scheme may be needed to indicate an expected BER of 1e-4 using the second modulation scheme with a 99% probability.

In some implementations, the PHY rate selection module 806 also is configured to, in instances in which the device is currently receiving wireless communications modulated using the higher rate second modulation scheme, determine to switch to the lower rate first modulation scheme in response to determining that a current BER is less than a threshold, or based on a statistical function of the bit metrics W(N) or B(N). In some such implementations, in response to determining to switch to the first modulation scheme, the PHY rate selection module 806 can generate and output the select signal SEL (or another signal) to indicate the determination to switch to the first modulation scheme.

In some implementations, the protocol exchange module 808 receives the select signal SEL and determines whether to initiate a protocol exchange with the second wireless device based on the select signal SEL. For example, in instances in which the current modulation scheme is the first modulation scheme and the select signal SEL indicates to switch to the second modulation scheme, the protocol exchange module can initiate a protocol exchange with the second wireless device to cause the second wireless device to switch modulation schemes such that it begins modulating subsequent symbols according to the second modulation scheme. Similarly, in instances in which the current modulation scheme is the second modulation scheme and the select signal SEL indicates to switch to the first modulation scheme, the protocol exchange module can initiate a protocol exchange with the second wireless device to cause the second wireless device to switch modulation schemes such that it begins modulating subsequent symbols according to the first modulation scheme. The protocol exchange may involve an exchange of two or three packets. For example, the protocol exchange module 808 may first generate and cause a transmitter to transmit an initial message proposing the change in the modulation scheme. The second wireless device may then generate and transmit a subsequent message in response to the initial message to indicate which modulation scheme it is prepared to accept. The protocol exchange module 808 may then transmit another message confirming the modulation scheme to be changed to.

Figure 9:
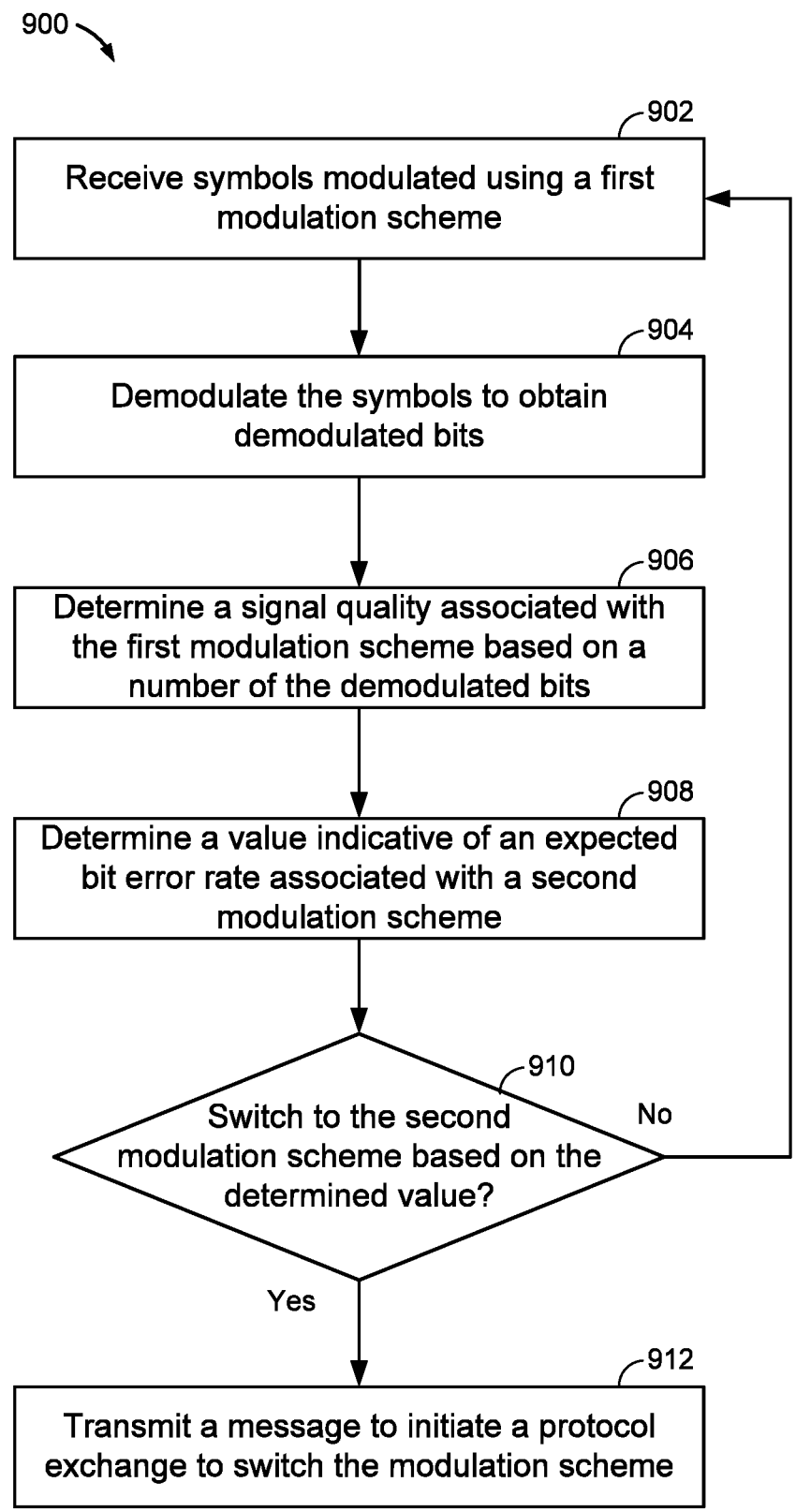
FIG. 9 shows a flowchart illustrating an example process for determining whether to switch from a first modulation scheme to a second modulation scheme according to some implementations.

FIG. 9 shows a flowchart illustrating an example process 900 for determining whether to switch from a first modulation scheme to a second modulation scheme according to some implementations. In some implementations, the process 900 is performed by a first wireless communications device, such as one of the apparatus 500 or the apparatus 600 described above with reference to FIGS. 5 and 6, respectively. In some specific implementations, the first wireless communications device can be configured as a Bluetooth device.

The process 900 begins in block 902 with receiving symbols modulated using a first modulation scheme from a second wireless device. For example, the symbols can be received from one or more antennas and transceivers as described with reference to FIGS. 5 and 6. In some implementations, the first modulation scheme can be based on one of the Bluetooth wireless communication protocols as defined in the Bluetooth Core Specification, such as the BR core configuration, the Bluetooth EDR core configuration, the HS Bluetooth core configuration, and the Bluetooth BLE core configuration. In some specific implementations, the modulated symbols may be modulated based on the LE 1M modulation scheme having a bit rate of 1 Mbps. In some other implementations, the first and second modulation schemes may be based on other configurations, such as the modulation and coding schemes (MCSs) associated with IEEE 802.11n, 802.11ac, 802.11ad, 802.11ah, 802.11ax or 802.11ay packets.

The process 900 continues in block 904 with demodulating the symbols to obtain demodulated bits. For example, the demodulation of the symbols can be performed by a demodulator such as the demodulators 508 and 618 described with reference to FIGS. 5 and 6, respectively. In block 906, the demodulator determines a signal quality associated with the first modulation scheme based on a number of the demodulated bits.

In some implementations, the process 900 proceeds in block 908 with determining a value indicative of an expected BER that would be obtained if using a second modulation scheme. For example, the second modulation scheme can be based on the LE 2M modulation scheme having a bit rate of 2 Mbps. The determination of the value indicative of the expected BER can be performed at least in part by an intermediate metric determination circuit such as the intermediate metric determination circuits 508, 626 and 702 described with reference to FIGS. 5, 6 and 7, respectively. The determination of the value indicative of the expected BER can include the determination of one or more intermediate metrics such as the intermediate metrics B(N), $B_{ACC}$ and $B_{ACC}^2$ described above. In some implementations, the determination of the value indicative of the expected BER can further include determining a mean $\overline{B}$ of the intermediate metrics B(N), a standard deviation $\sigma_B$ of the intermediate metrics B(N) based on the intermediate metrics $B_{ACC}$ and $B_{ACC}^2$, and a final metric BMR indicative of the expected BER based on the mean $\overline{B}$ and standard deviation $\sigma_B$. For example, the determination of the mean $\overline{B}$, standard deviation $\sigma_B$ and final metric BMR can be determined by a final bit metric determination module such as the final bit metric determination module 704 or 804 described with reference to FIGS. 7 and 8, respectively.

In block 910, the process 900 proceeds with determining whether to switch to the second modulation scheme based on the determined value indicative of the expected BER. For example, block 910 can be performed by a PHY rate selection module such as the PHY rate selection module 806 described with reference to FIG. 8. In some implementations, determining whether to switch to the second modulation scheme can be based on a comparison of the BMR, or a function of the BMR, to a threshold. For example, if the BMR is greater than a threshold, the process 900 may proceed back to block 902 or else wait a time duration before initiating the process 900 again. Contrarily, if the BMR is less than a threshold, the process 900 may continue to block 912, in which a message is transmitted to the second wireless device currently modulating symbols based on the first modulation scheme to cause the second wireless device to begin modulating symbols based on the second modulation scheme. For example, portions of block 912 may be performed by a protocol exchange module such as the protocol exchange module 808 described above with reference to FIG. 8.

Figure 10:
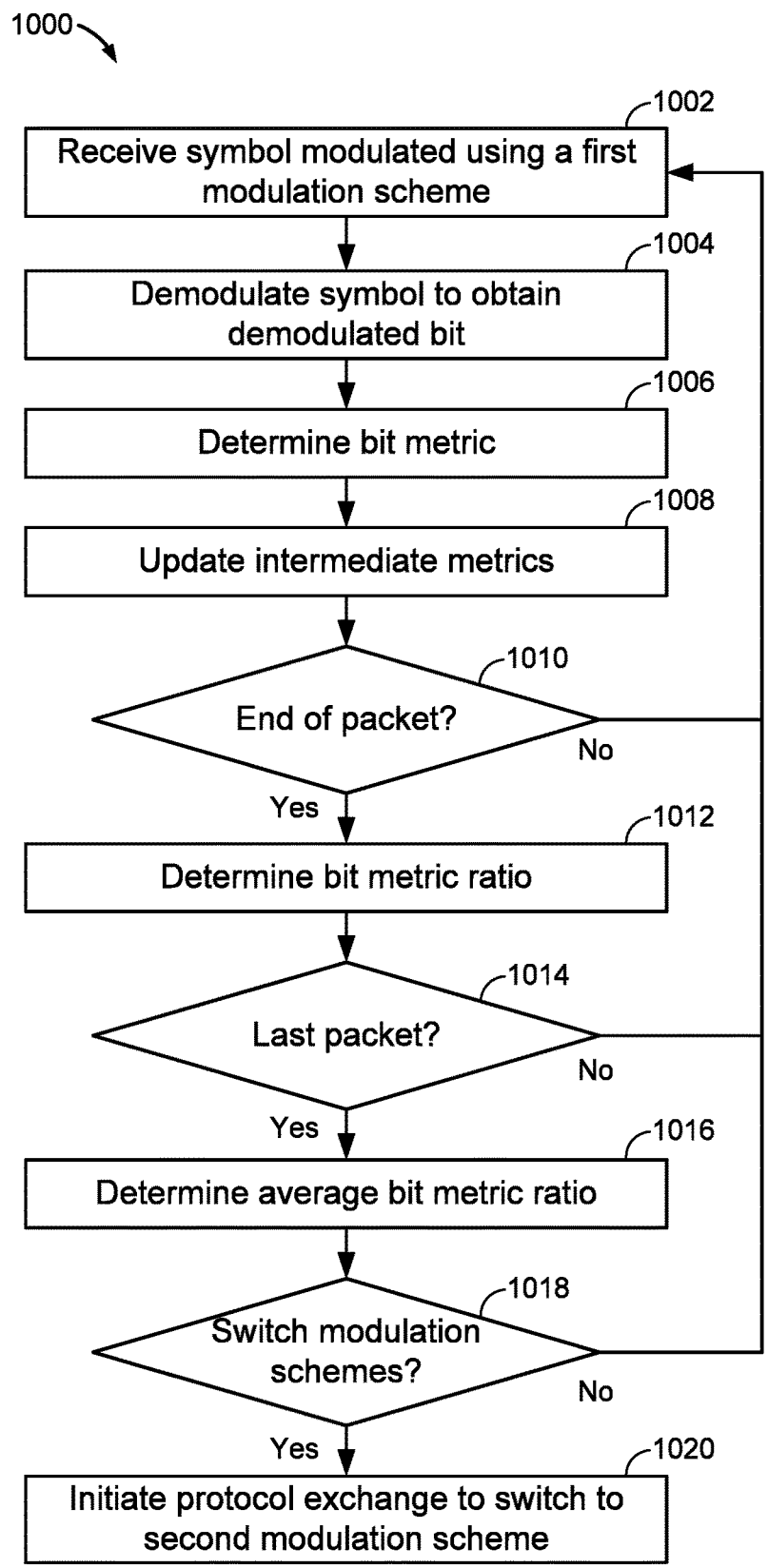
FIG. 10 shows a flowchart illustrating another example process for determining whether to switch from a first modulation scheme to a second modulation scheme according to some implementations.

FIG. 10 shows a flowchart illustrating another example process 1000 for determining whether to switch from a first modulation scheme to a second modulation scheme according to some implementations. In some implementations, the process 1000 is performed by a first wireless communications device, such as one of the apparatus 500 or the apparatus 600 described above with reference to FIGS. 5 and 6, respectively. In some implementations, the first wireless communications device can be configured as a Bluetooth device.

The process 1000 begins in block 1002 with receiving a symbol modulated using a first modulation scheme from a second wireless device. For example, the symbol can be the $k^{th}$ symbol of a packet having a length L received from one or more antennas and transceivers as described with reference to FIGS. 5 and 6. In some implementations, the first modulation scheme can be based on one of the Bluetooth wireless communication protocols as defined in the Bluetooth Core Specification, such as the BR core configuration, the Bluetooth EDR core configuration, the HS Bluetooth core configuration, and the Bluetooth BLE core configuration. In some specific implementations, the modulated symbols may be modulated based on the LE 1M modulation scheme having a bit rate of 1 Mbps. The process 1000 continues in block 1004 with demodulating the symbol to obtain a demodulated bit. For example, the demodulation of the $k^{th}$ symbol can be performed by a decision feedback demodulator such as the demodulators 508 and 618 described with reference to FIGS. 5 and 6, respectively.

In block 1006, the demodulator determines a $k^{th}$ bit metric W(k) such as that described above. The process 1000 proceeds in block 1008 with updating intermediate metrics. For example, the updating of the intermediate metrics can be performed at least in part by an intermediate metric determination circuit such as the intermediate metric determination circuits 508, 626 and 702 described with reference to FIGS. 5, 6 and 7, respectively. The updating of the intermediate metrics can include the determination and updating of the $k^{th}$ intermediate metrics B(k), $B_{ACC}$ and $B_{ACC}^2$ described above. For example, the intermediate metric B(k) can be determined, and subsequently, the intermediate metrics $B_{ACC}$ and $B_{ACC}^2$ can be updated based on the current value of the intermediate metric B(k). Updating the intermediate metrics $B_{ACC}$ and $B_{ACC}^2$ can include, as is also described above, sequentially accumulating the values of the intermediate metrics $B_{ACC}$ and $B_{ACC}^2$ obtained for the $k^{th}$ and previous values of the intermediate metric B(N) obtained for the current packet.

The process 1000 proceeds in block 1010 with determining whether the end of the current packet has been reached. If the $k^{th}$ symbol is not the last symbol, the process 1000 returns to block 1002 and a next symbol of the current packet is received and demodulated. If, on the other hand, the $k^{th}$ symbol is the last symbol of the packet, the process 1000 proceeds in block 1012 with determining a final metric, such as the normalized bit metric ratio BMR described above. The final metric BMR is indicative of an expected BER that would be obtained if using a second modulation scheme. For example, the second modulation scheme can be based on the LE 2M modulation scheme having a bit rate of 2 Mbps. As described above, the determination of the final metric BMR can include determining a mean $\overline{B}$ of the intermediate metrics B(N), a standard deviation $\sigma_B$ of the intermediate metrics B(N) based on the accumulated intermediate metrics $B_{ACC}$ and $B_{ACC}^2$, and the final metric BMR based on the mean $\overline{B}$ and standard deviation $\sigma_B$. For example, the determination of the mean $\overline{B}$, standard deviation $\sigma_B$ and final metric BMR can be determined by a final bit metric determination module such as the final bit metric determination module 704 or 804 described with reference to FIGS. 7 and 8, respectively.

The process 1000 proceeds in block 1014 with determining whether the current packet is the last packet to be used. If the current packet is not the last packet, the process 1000 returns to block 1002 and a next symbol of a next packet is received and demodulated. If, on the other hand, the current packet is the last packet, the process 1000 proceeds in block 1016 with determining an average of the final bit metric BMRs determined for the multiple packets. The average final bit metric BMR is indicative of an expected BER that would be obtained if using a second modulation scheme. For example, the second modulation scheme can be based on the LE 2M modulation scheme having a bit rate of 2 Mbps.

In block 1018, the process 1000 proceeds with determining whether to switch to the second modulation scheme based on the average bit metric ratio. For example, block 1018 can be performed by a PHY rate selection module such as the PHY rate selection module 806 described with reference to FIG. 8. In some implementations, determining whether to switch to the second modulation scheme can be based on a comparison of the average BMR to a threshold. For example, if the average BMR is greater than a threshold, the process 1000 may proceed back to block 1002 or else wait a time duration before initiating the process 1000 again. Contrarily, if the average BMR is less than a threshold, the process 1000 may continue to block 1020, in which a protocol exchange is initiated to switch the modulation schemes. For example, a message can be transmitted to the second wireless device currently modulating symbols based on the first modulation scheme to cause the second wireless device to begin modulating symbols based on the second modulation scheme. For example, portions of block 1020 may be performed by a protocol exchange module such as the protocol exchange module 808 described above with reference to FIG. 8.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
   receiving symbols modulated using a first Bluetooth (BT) Low Energy (LE) modulation scheme from a second wireless communication device, the first BT LE scheme being a BT LE1 modulation scheme;
demodulating the symbols to obtain demodulated bits;
determining, for each of the demodulated bits, on a per-bit sequential basis, an initial bit metric;
determining an intermediate bit metric on the per-bit sequential basis by accumulating values associated with the initial bit metrics;
determining an average of the intermediate metric over a respective number of the demodulated bits;
determining a standard deviation of the intermediate metric over the respective number of the demodulated bits;
determining a final bit metric based on the average and the standard deviation;
determining whether to switch to a second BT LE modulation scheme based on the determined final bit metric, the second BT LE scheme being a BT LE2 modulation scheme; and
transmitting a message to the second wireless communication device to initiate a protocol exchange with the second wireless device to switch the modulation scheme to the second BT LE modulation scheme based on determining to switch to the second BT LE modulation scheme.

2. The method of claim 1, wherein determining the final bit metric includes dividing the standard deviation by the average.

3. The method of claim 1, wherein:
the symbols are received in a number of packets;
determining the average of the first metric includes determining an average of the first metric for each packet;
determining the standard deviation includes determining a standard deviation for each packet; and
determining the final bit metric includes determining the second metric for each packet.

4. The method of claim 3, further including determining an average of the final bit metric over all of the number of packets.

5. The method of claim 4, wherein the determination of whether to switch to the second BT LE modulation scheme based on the determined value includes comparing the average of the second metric to a threshold.

6. The method of claim 1, wherein the initial bit metrics and the intermediate bit metrics are determined entirely in hardware.

7. The method of claim 1, wherein the determination of whether to switch to the second BT LE modulation scheme based on the determined final bit metric does not involve a determination by a host processing software application.

8. The method of claim 1, further including determining whether a quantity of symbols or a quantity of demodulated bits has reached a threshold, and, responsive to determining that the quantity has reached the threshold, determining the final bit metric.

9. The method of claim 1, further including: determining to switch to the second BT LE modulation scheme based on the determined final bit metric;
receiving additional symbols modulated using the second BT LE modulation scheme from the second wireless communication device;
demodulating the additional symbols to obtain additional demodulated bits;
determining a bit error rate of a number of the additional demodulated bits;
determining whether to switch to the first BT LE modulation scheme based on the bit error rate; and
transmitting another message to the second wireless communication device to initiate another protocol exchange with the second wireless communication device to switch the modulation scheme to the first BT LE modulation scheme based on determining to switch back to the first BT LE modulation scheme.

10. The method of claim 1, wherein the determinations of the initial bit metrics are based on a maximum likelihood (ML) criterion.

11. The method of claim 1, further comprising detecting, on the per-bit sequential basis, for the occurrence of an error based on a value of the respective initial bit metric.

12. A wireless communications device comprising:
at least one antenna configured to receive symbols modulated using a first Bluetooth (BT) Low Energy (LE) modulation scheme from a second wireless communication device, the first BT LE scheme being a BT LE1 modulation scheme;
at least one transceiver coupled with the at least one antenna and configured to receive the symbols;
a demodulator configured to:
demodulate the received symbols to obtain demodulated bits, and
determine, for each of the demodulated bits, on a per-bit sequential basis, an initial bit metric;
an intermediate metric determination circuit configured to determine an intermediate bit metric on the per-bit sequential basis by accumulating values associated with the initial bit metrics; and
a processor to:
determine an average of the intermediate metric over a respective number of the demodulated bits,
determine a standard deviation of the intermediate metric over the respective number of the demodulated bits, and
determine a final bit metric based on the average and the standard deviation;
determine whether to switch to a second BT LE modulation scheme based on the determined final bit metric, the second BT LE scheme being a BT LE2 modulation scheme; and
transmit a message to the second wireless communication device via the at least one transceiver and the at least one antenna to initiate a protocol exchange with the second wireless communication device to switch the modulation scheme to the second BT LE modulation scheme based on determining to switch to the second BT LE modulation scheme.

13. The wireless communications device of claim 12, wherein:
the symbols are received in a number of packets;
determining the average of the first metric includes determining an average of the first metric for each packet;
determining the standard deviation includes determining a standard deviation for each packet; and
determining the final bit metric includes determining the second metric for each packet.

14. The wireless communications device of claim 12, wherein the processor is further configured to determine whether a quantity of symbols or a quantity of demodulated bits has reached a threshold, and, responsive to determining that the quantity has reached the threshold, determine the final bit metric.

15. The wireless communication device of claim 12, wherein the determinations of the initial bit metrics are based on a maximum likelihood (ML) criterion.

16. The wireless communication device of claim 12, wherein the demodulator is further configured to detect, on the per-bit sequential basis, for the occurrence of an error based on a value of the respective initial bit metric.

* * * * *